(12) United States Patent
Huang et al.

(10) Patent No.: US 12,088,090 B1
(45) Date of Patent: Sep. 10, 2024

(54) ELECTROSTATIC DISCHARGE PROTECTION APPARATUS AND METHOD FOR DATA TRANSCEIVER

(71) Applicant: Marvell Asia Pte Ltd, Singapore (SG)

(72) Inventors: Shaowu Huang, Sunnyvale, CA (US); Dance Wu, Palo Alto, CA (US)

(73) Assignee: Marvell Asia Pte Ltd, Singapore (SG)

( * ) Notice: Subject to any disclaimer, the term of this patent is extended or adjusted under 35 U.S.C. 154(b) by 283 days.

(21) Appl. No.: 17/659,787

(22) Filed: Apr. 19, 2022

Related U.S. Application Data

(60) Provisional application No. 63/178,886, filed on Apr. 23, 2021.

(51) Int. Cl.
*H02H 9/04* (2006.01)
*H04B 1/3827* (2015.01)
*H04B 1/3888* (2015.01)

(52) U.S. Cl.
CPC ........... *H02H 9/046* (2013.01); *H04B 1/3833* (2013.01); *H04B 1/3888* (2013.01)

(58) Field of Classification Search
CPC .............. H04L 25/026; H04L 25/0266; H04L 25/0272; H04L 25/0274; H04L 25/0276; H04L 25/028; H04L 25/0292; H04L 25/0298; H04L 12/10; H04L 12/12; H04B 1/3833; H04B 1/3888; H02H 9/04; H02H 9/046
USPC ...................................... 361/56, 65, 118–119
See application file for complete search history.

(56) References Cited

U.S. PATENT DOCUMENTS

| | | | | |
|---|---|---|---|---|
| 7,965,480 | B2* | 6/2011 | Crawley | H04L 25/0276 375/257 |
| 8,982,753 | B2* | 3/2015 | Diab | H04W 52/0235 455/574 |
| 9,743,171 | B1* | 8/2017 | Anderson | H04R 1/1016 |
| 11,418,369 | B2* | 8/2022 | Gardner | H04L 25/0266 |
| 2005/0122140 | A1* | 6/2005 | Peker | H03B 1/00 327/108 |
| 2006/0019629 | A1* | 1/2006 | Berson | H04M 19/08 455/402 |
| 2007/0071112 | A1* | 3/2007 | Gattani | H04L 25/0272 375/257 |
| 2009/0207538 | A1* | 8/2009 | Crawley | H04L 12/10 361/56 |

(Continued)

*Primary Examiner* — Tuan T Dinh

(57) ABSTRACT

A physical layer transceiver assembly includes physical layer transceiver circuitry having an input/output terminal configured for coupling to data channel medium, and an electrostatic discharge protection circuit coupled between the terminal and a ground of the assembly. The electrostatic discharge protection circuit includes a reactive filter network coupled to the terminal and configured to selectively limit current flow through the electrostatic discharge protection circuit, and an electrostatic discharge protection device coupled between the reactive filter network and the ground of the assembly. Where the electrostatic discharge protection device is a snapback device, the reactive filter network is configured to limit current at frequencies that adversely affect the snapback device. One implementation of the reactive filter network is a band-stop filter that limits current in a frequency band including the frequencies that adversely affect the snapback device, and passes current at frequencies above and below the frequency band.

17 Claims, 5 Drawing Sheets

(56) References Cited

U.S. PATENT DOCUMENTS

2018/0026525 A1* 1/2018 Gardner ............. H04L 25/0272
                                                                         333/181

* cited by examiner

ELECTROSTATIC DISCHARGE PROTECTION APPARATUS AND METHOD FOR DATA TRANSCEIVER

CROSS REFERENCE TO RELATED APPLICATION

This disclosure claims the benefit of commonly-assigned United States Provisional Patent Application No. 63/178,886, filed Apr. 23, 2021, which is hereby incorporated by reference herein in its entirety.

FIELD OF USE

This disclosure relates to electrostatic discharge protection for a data transceiver. More particularly, this disclosure relates to mitigating the effects of the discharge current flowing through an electrostatic discharge protection device that protects a transceiver in a data network.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

It is typical to provide electrostatic discharge protection for electronic devices that are subject to exposure to static electricity, and particularly a device that is frequently touched by a user who may impart a static electric shock to the device. Electrostatic discharge protection devices typically conduct any static electricity to ground so that the static electricity does not damage the device being protected or influence any signals transmitted or received by the device being protected. However, in some environments—particularly a closed environment, such as a vehicle, without a true earth ground—the discharge current through the electrostatic discharge protection device may couple through the device ground back to the device.

SUMMARY

According to implementations of the subject matter of this disclosure, a physical layer transceiver assembly includes physical layer transceiver circuitry having an input/output terminal configured for coupling to data channel medium, and an electrostatic discharge protection circuit coupled between the input/output terminal and a ground of the physical layer transceiver assembly. The electrostatic discharge protection circuit includes a reactive filter network coupled to the input/output terminal and configured to selectively limit current flow through the electrostatic discharge protection circuit, and an electrostatic discharge protection device coupled between the reactive filter network and the ground of the physical layer transceiver assembly.

In a first implementation of such a physical layer transceiver assembly, the electrostatic discharge protection device may be a snapback device, and the reactive filter network may be configured to limit current at frequencies that adversely affect the snapback device.

According to a first aspect of that first implementation, the reactive filter network may be configured as a band-stop filter that limits current in a frequency band including the frequencies that adversely affect the snapback device, and passes current at frequencies above and below the frequency band.

In a first instance of that first aspect, the reactive filter network may include an inductor coupled to a capacitor as an L-C circuit having a resonant frequency in the frequency band.

In one variant of that first instance, the reactive filter network may further include a resistor coupled to the inductor and the capacitor to adjust a transfer function of the reactive filter network.

A second implementation of such a physical layer transceiver assembly may include an integrated circuit die, wherein the physical layer transceiver circuitry, the input/output terminal, the electrostatic discharge protection device, the reactive filter network and the ground of the physical layer transceiver assembly are formed on the integrated circuit die.

A third implementation of such a physical layer transceiver assembly may include an integrated circuit package housing an integrated circuit die, wherein the physical layer transceiver circuitry may be formed on the integrated circuit die, the input/output terminal may be a terminal of the integrated circuit housing, and the electrostatic discharge protection device and the reactive filter network may be housed in the integrated circuit package.

A fourth implementation of such a physical layer transceiver assembly may further include a printed circuit board, and a connector mounted on the printed circuit board for coupling to the data channel medium. The physical layer transceiver circuitry, the electrostatic discharge protection device and the reactive filter network may be mounted on the printed circuit board, and the input/output terminal may be coupled to the connector.

According to implementations of the subject matter of this disclosure, a data network includes a data channel medium, and a plurality of physical layer transceiver assemblies. At least one of the physical layer transceiver assemblies includes physical layer transceiver circuitry having an input/output terminal, a connector coupled to the input/output terminal and to the data channel medium, and an electrostatic discharge protection circuit coupled between the connector and a ground of the physical layer transceiver assembly, the electrostatic discharge protection circuit including a reactive filter network coupled to the connector and configured to selectively limit current flow through the electrostatic discharge protection circuit, and an electrostatic discharge protection device coupled between the reactive filter network and the ground of the physical layer transceiver assembly.

In a first implementation of such a data network, the electrostatic discharge protection device may be a snapback device, and the reactive filter network may be configured to limit current at frequencies that adversely affect the snapback device.

According to a first aspect of that first implementation, the reactive filter network may be configured as a band-stop filter that limits current in a frequency band including the frequencies that adversely affect the snapback device, and passes current at frequencies above and below the frequency band.

In a first instance of that first aspect, the reactive filter network may include an inductor coupled to a capacitor as an L-C circuit having a resonant frequency in the frequency band.

In a first variant of that first instant, the reactive filter network may further include a resistor coupled to the inductor and the capacitor to adjust a transfer function of the reactive filter network.

In a second implementation of such a data network, the at least one physical layer transceiver assembly may further include a printed circuit board, and the physical layer transceiver circuitry, the connector, the electrostatic discharge protection device and the reactive filter network may be mounted on the printed circuit board.

According to implementations of the subject matter of this disclosure, a method for transmitting and receiving data in a data network includes protecting physical layer transceiver circuitry in the data network from electrostatic discharge by selectively limiting current flow through the electrostatic discharge protection circuit by coupling a reactive filter network to an input/output terminal of the physical layer transceiver circuitry, and coupling an electrostatic discharge protection device between the reactive filter network and a ground of the physical layer transceiver circuitry.

In a first implementation of such a method, the electrostatic discharge protection device may be a snapback device, and coupling the reactive filter network to the input/output terminal of the physical layer transceiver circuitry may include coupling, to the input/output terminal of the physical layer transceiver circuitry, a reactive filter network that is configured to limit current at frequencies that adversely affect the snapback device.

According to a first aspect of that first implementation, coupling, to the input/output terminal of the physical layer transceiver circuitry, the reactive filter network that is configured to limit current at frequencies that adversely affect the snapback device, may include coupling, to the input/output terminal of the physical layer transceiver circuitry, a reactive filter network configured as a band-stop filter that limits current in a frequency band including the frequencies that adversely affect the snapback device, and passes current at frequencies above and below the frequency band.

In a first instance of that first aspect, coupling, to the input/output terminal of the physical layer transceiver circuitry, the reactive filter network configured as the band-stop filter that limits current in the frequency band including the frequencies that adversely affect the snapback device, and passes current at frequencies above and below the frequency band, may include coupling, to the input/output terminal of the physical layer transceiver circuitry, an inductor coupled to a capacitor as an L-C circuit having a resonant frequency in the frequency band.

A first variant of that first instance may further include coupling a resistor to the inductor and the capacitor to adjust a transfer function of the reactive filter network.

In a second implementation of such a method, coupling the reactive filter network to the input/output terminal of the physical layer transceiver circuitry may include coupling the reactive filter network to a cable connector that is coupled to the input/output terminal of the physical layer transceiver circuitry.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
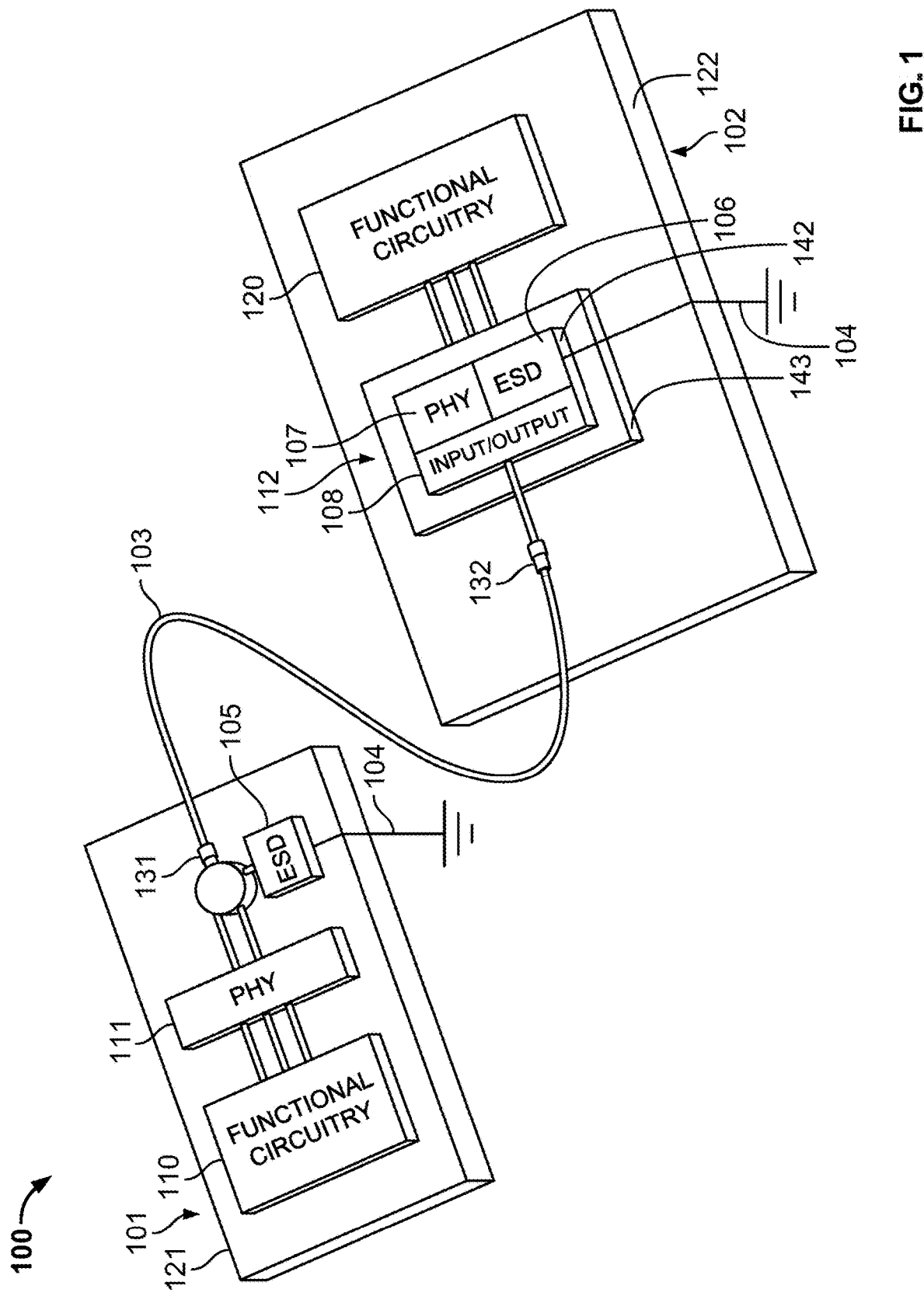
FIG. 1 shows linked physical layer communication devices, which may be disposed in a network environment, incorporating implementations of the subject matter of this disclosure.

As noted above, it is typical to provide electrostatic discharge protection for electronic devices that are subject to exposure to static electricity, and particularly a device that is frequently touched by a user who may impart a static electric shock to the device. Electrostatic discharge protection devices typically conduct any static electricity to ground so that the static electricity does not damage the device being protected or influence any signals transmitted or received by the device being protected.

However, in some environments—particularly a closed environment, such as a vehicle, without a true earth ground—the discharge current through the electrostatic discharge protection device may couple through the device ground back to the device. The discharge current, so coupled back, could interfere with device signals, and, if the current is large enough, even physically damage the device. For example, although any type of electrostatic discharge protection device may give rise to a discharge current large enough to have such effects, a class of electrostatic discharge protection devices that rely on the snapback phenomenon—e.g., transient voltage suppression (TVS) diodes—may experience a sudden large discharge current once the snapback trigger voltage is reached. In addition, snapback devices may become "stuck" in the snapback mode, once triggered, in the presence of radiofrequency—i.e., alternating current—signals as may be found in a network device (such as an Ethernet physical layer transceiver (PHY)), or the snapback trigger voltage may be altered.

Some of the drawbacks of electrostatic discharge protection devices, and particularly snapback devices, may be mitigated by including an inductor in series with the electrostatic discharge protection device to intentionally slow the electrostatic discharge protection response. However, slowing the electrostatic discharge protection response degrades the electrostatic discharge protection performance, especially for high-data-rate systems such as Ethernet networks (including automotive Ethernet networks).

In accordance with implementations of the subject matter of this disclosure, the potential drawbacks of an electrostatic discharge protection device (including, but not limited to, a snapback device) may be mitigated by including, in series with an electrostatic discharge protection device, a reactive filter network rather than an inductor, where the reactive filter network is configured to selectively limit current flow through the electrostatic discharge protection circuit.

The reactive filter network may include a combination of reactance elements, such as, without limitation, a parallel LC circuit including a capacitor in parallel with an inductor, or an RLC circuit including a capacitor, an inductor and a resistor in parallel with one another, or a capacitor in parallel with a series combination of an inductor and a resistor, or an inductor in parallel with a series combination of a capacitor and a resistor.

In implementations of the subject matter of this disclosure, the reactive filter network may be configured to limit current flow through the electrostatic discharge protection circuit selectively by frequency, by including a capacitor in addition to an inductor to pass some of the higher frequencies (via the capacitor) that would otherwise be limited or blocked by the inductor. Passing those higher frequencies may improve performance, particularly in high-rate data applications such as Ethernet physical layer transceivers (especially in automotive Ethernet networks where fast response time is important), while still allowing the inductor to filter the frequencies where the foregoing drawbacks of the snapback phenomenon are more pronounced.

The reactive filter network according to implementations of the subject matter of this disclosure functions as a band-stop, or band-reject, filter with rejection/blocking characteristics at the band of frequencies associated with drawback of snapback devices, which are typically between several megahertz and about 50 MHz to several hundred megahertz, while passing frequencies below and above the blocked frequencies. Passing of the lower frequencies allows the snapback device to provide its desired function of protecting against electrostatic discharge with is primarily a direct current or very low frequency phenomenon. Passing of the higher frequencies provides a shorter ESD protection response time, which is important for high-speed signaling such as automotive Ethernet applications.

The rejected frequency band of the reactive filter network according to implementations of the subject matter of this disclosure should match the sensitivity frequencies of the snapback device used for ESD protection, which can be achieved by selecting the inductance and capacitance to form a circuit whose resonant frequency is in the targeted stop band. Typical sensitivity frequencies of snapback ESD devices may be between tens of megahertz and hundreds of megahertz and the inductance and capacitance values can be selected accordingly. The reactive filter network in some implementations may also include a resistor whose resistance value and placement in the circuit can be used to adjust the transfer function response of the filter.

In the context of a data network, a plurality of physical layer transceivers may be coupled to a data channel medium (e.g., a coaxial cable, or a shielded or unshielded parallel or twisted pair cable). An electrostatic discharge protection device, including a reactive filter network in accordance with the subject matter of this disclosure, may be coupled between ground and a point at or near where the physical layer transceiver is coupled to the channel medium. In some implementations, an integrated circuit physical layer transceiver may be disposed on a printed circuit board and coupled to the channel medium by a connector, and the electrostatic discharge protection device including the reactive filter network may be disposed on the printed circuit board and coupled between the connector and ground. In other implementations, the electrostatic discharge protection device including the reactive filter network may be included in the integrated circuit device and coupled between an input/output conductor (e.g., at or near a terminal such as an input/output pad or pin) and ground. In those other implementations, the electrostatic discharge protection device including the reactive filter network may be incorporated in the integrated circuit die itself, or may be mounted within the integrated circuit package but external to the integrated circuit die itself.

Data signaling in various implementations may be single-ended or differential, and the channel medium will accordingly have one or two conductors. In a single-ended implementation, the electrostatic discharge protection device including the reactive filter network is coupled between the single conductor and ground. In a differential implementation (where the channel medium may be, e.g., a coaxial cable or a shielded or unshielded, parallel or twisted, wire pair), a respective electrostatic discharge protection device, including a respective reactive filter network, may be coupled between each of the two conductors (i.e., each differential leg) and ground.

Suitable electrostatic discharge protection devices for use with implementations of the subject matter of this disclosure may include snapback devices and non-snapback devices, such as an RClamp0582BQ low capacitance TVS device available from Semtech Corporation, of Camarillo, California, a PESD2ETH-D ultra-low capacitance double rail-to-rail ESD protection diode available from Nexperia, of Nijmegen, Netherlands, or an AVRL101A1R1NTA varistor available from TDK Corporation, of Tokyo, Japan. Such electrostatic discharge protection devices may be coupled with reactive networks as described below.

The subject matter of this disclosure may be better understood by reference to FIGS. 1-7.

FIG. 1 shows a simplified network environment 100 incorporating implementations of the subject matter of this disclosure. While only two nodes 101, 102 are shown, network environment 100 may be an automotive Ethernet network (or any Ethernet network) in which a first network node 101 and a second network node 102, as well as additional network nodes (not shown), are coupled to a network channel medium 103, which may be a coaxial cable, or a shielded or unshielded parallel or twisted pair cable. By way of example only, the various nodes may be different devices in an automobile (not shown), such as an engine control unit, an infotainment unit, speakers, displays, sensors (e.g., a back-up camera, RADAR, LIDAR, temperature sensors), etc.

Node 101 may include functional circuitry 110 which in an automotive implementation may be one of the aforementioned automotive devices, and a physical layer transceiver (PHY) integrated circuit device 111 mounted on a printed circuit board 121 and coupled to a connector 131 that in turn is coupled to channel medium 103. Connector 131 may be coupled to a chassis ground 104 of the automobile via electrostatic discharge protection circuitry 105 in accordance with implementations of the subject matter of this disclosure. In this implementation, electrostatic discharge protection circuitry 105 is mounted on printed circuit board 121 along with integrated circuit device 111 and connector 131.

Node 102 may include functional circuitry 120 which is one of the aforementioned automotive devices, and a physical layer transceiver (PHY) integrated circuit device 112 mounted on a printed circuit board 122 and coupled to a connector 132 that in turn is coupled to channel medium 103. In this implementation, electrostatic discharge protection circuitry 106 in accordance with the subject matter of this disclosure is incorporated within integrated circuit device 112. Specifically, electrostatic discharge protection circuitry 106 may be formed on the integrated circuit die 142 (which sits atop a substrate 143) which also includes integrated circuit PHY circuitry 107. Electrostatic discharge protection circuitry 106 may be coupled to (a) an input/output pad or pin region 108 of integrated circuit PHY device 112 that is coupled to connector 132, and (b) a conductor within integrated circuit die 142 that is coupled to chassis ground 104 of the automobile.

Figure 2:
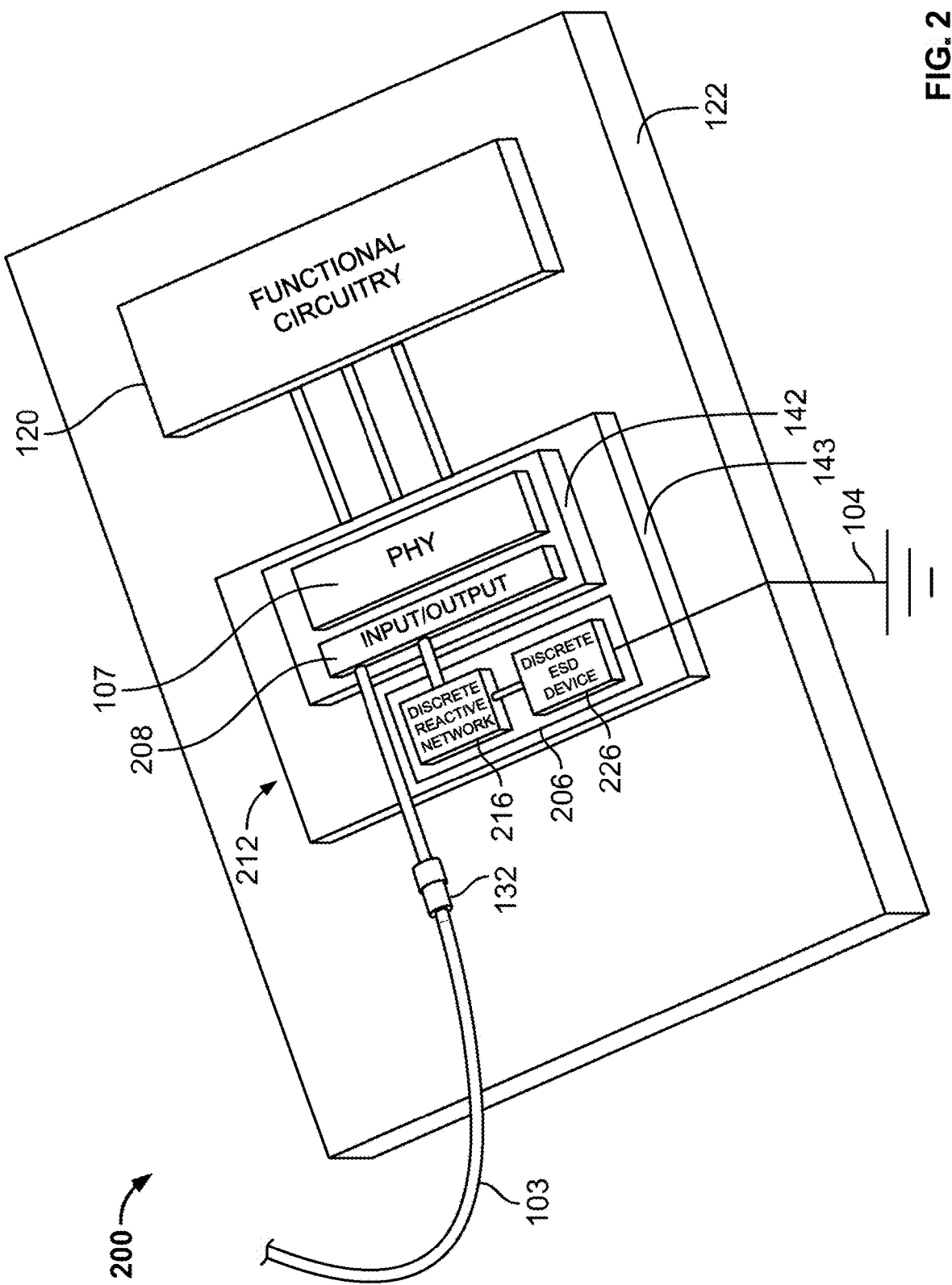
FIG. 2 shows an alternative implementation of a network node in accordance with the subject matter of this disclosure.

In an alternative implementation 200 of node 102 shown in FIG. 2, electrostatic discharge protection circuitry 206 may include discrete components—including reactance elements 216 (forming a reactive network as described above) and electrostatic discharge (ESD) device 226—packaged within integrated circuit PHY device 212, on substrate 143, but separately from integrated circuit die 142. Similarly to the case of circuitry 106, electrostatic discharge protection circuitry 206 may be coupled between an input/output or pin region 208 of integrated circuit PHY device 212 that is coupled to connector 132, and a conductor within integrated circuit PHY device 112 that is coupled to chassis ground 104 of the automobile.

Figure 3:
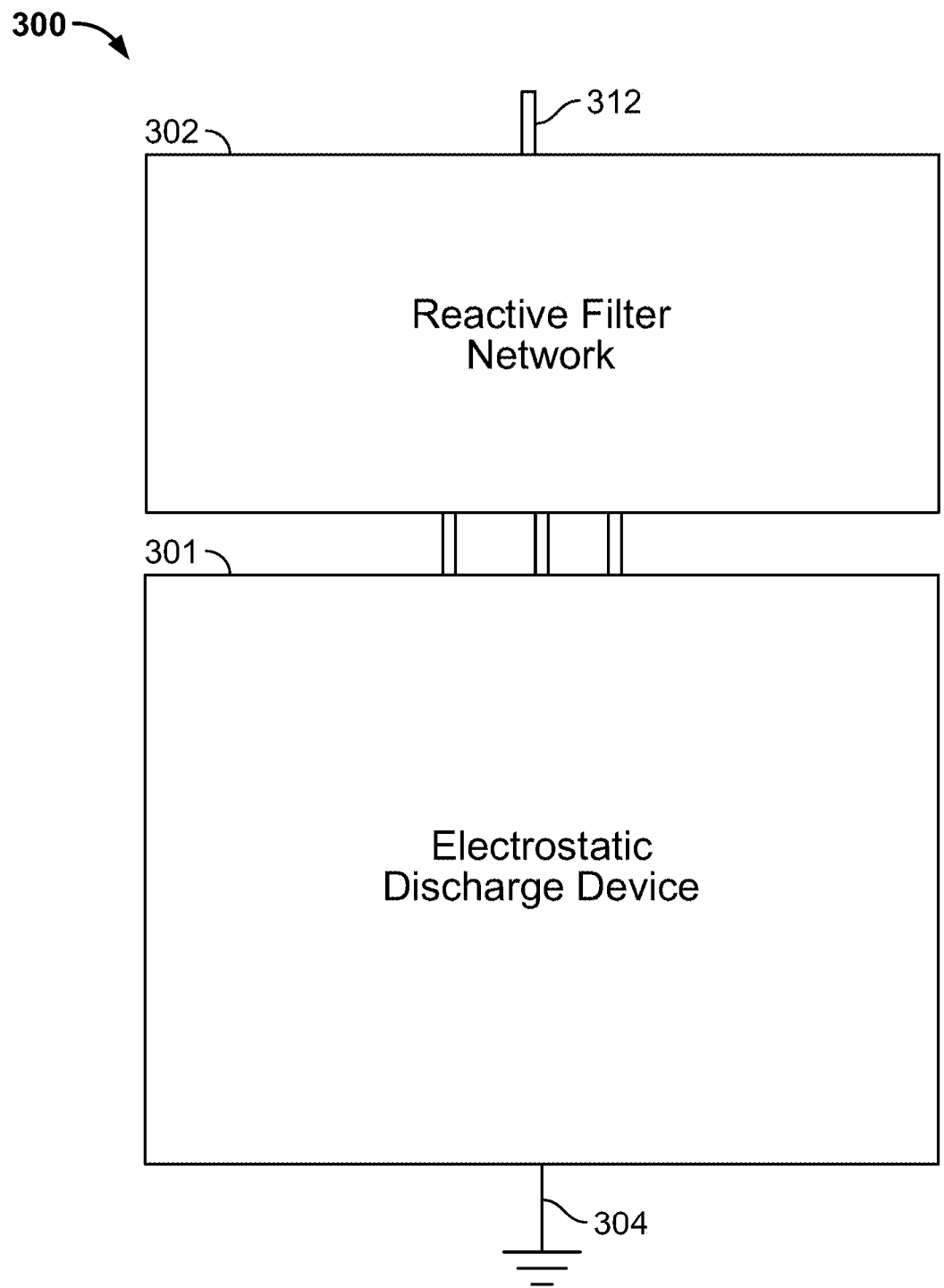
FIG. 3 is a diagrammatic view of the circuit structure of electrostatic discharge protection circuitry in accordance with implementations of the subject matter of this disclosure.

Implementations of electrostatic discharge protection circuitry 105, and electrostatic discharge protection circuitry 106 or 206 may have the circuit structure 300 shown diagrammatically in FIG. 3. In accordance with implementations of the subject matter of this disclosure, electrostatic discharge protection circuit structure 300 includes an electrostatic discharge protection device 301 coupled to ground 304 and to reactive filter network 302. Reactive filter network 302 is further configured for coupling at 312 to a discrete connector such as connector 131 or to an input/output pad or pin of integrated circuit PHY device such as input/output pad or pin region 108/208 of integrated circuit PHY device 112/212.

Implementations of reactive filter network 302 may have any one of the structures shown in FIGS. 4-7.

Figure 4:
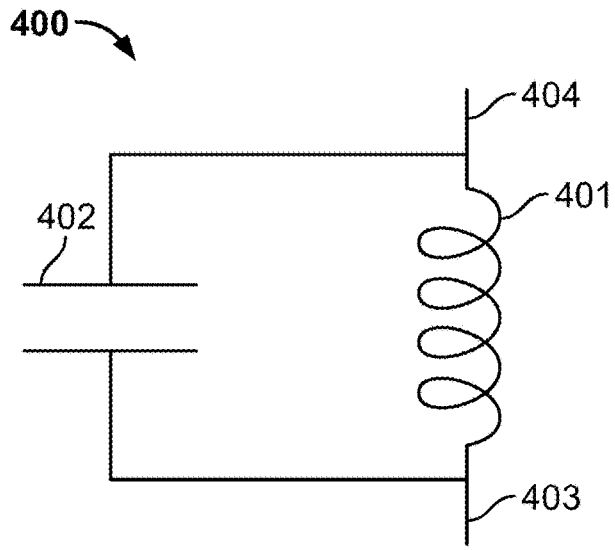
FIG. 4 is a schematic diagram of a first implementation of a reactive filter network in the electrostatic discharge protection circuitry of FIG. 3.

A basic implementation 400 of reactive filter network 302 is shown in FIG. 4 and includes an inductor 401 in parallel with a capacitor 402, for coupling to an electrostatic discharge protection device at 403, and, at 404, to a connector such as connector 131 or to an input/output pad or pin such as in input/output pad or pin region 108/208. Inductor 401 blocks frequencies in a lower range that may cause undesirable snapback voltage reduction, but capacitor 402 passes higher frequencies, which can balance performance in terms of mitigation of snapback drawback effects while providing a fast electrostatic discharge protection response.

As described above, the reactive filter network according to implementations of the subject matter of this disclosure functions as a band-stop, or bank-reject, filter with rejection/blocking characteristics at the band of frequencies associated with the drawbacks, described above, of snapback devices. Those effects may occur at frequencies between several megahertz and about 50 MHz to several MHZ, while passing frequencies below and above the blocked frequencies. Passing of the lower frequencies allows the snapback device to provide its desired function of protecting against electrostatic discharge with is primarily a direct current or very low frequency phenomenon. Passing of the higher frequencies provides a shorter ESD protection response time, which is important for high-speed signaling such as automotive Ethernet applications.

The rejected frequency band of the reactive filter network according to implementations of the subject matter of this disclosure should match the sensitivity frequencies of the snapback device used for ESD protection, which can be achieved by selecting the inductance and capacitance to form a circuit whose resonant frequency is in the targeted stop band. Typical sensitivity frequencies of snapback ESD devices may be between tens of megahertz and hundreds of megahertz, and the inductance and capacitance values can be selected accordingly. The reactive filter network in some implementations may also include a resistor whose resistance value and placement in the circuit can be used to adjust the transfer function response of the filter.

For example, in some high-speed implementations, such as a multi-gigabit automotive Ethernet implementation, the blocked frequency band is about 100 MHz, while frequencies in such implementations, in the gigahertz range are passed. In such implementations, passing the higher frequencies may shorten the electrostatic discharge protection response time by a factor of more than 4, from over 2 ns without capacitor 402 to under 0.5 ns with capacitor 402.

Figure 5:
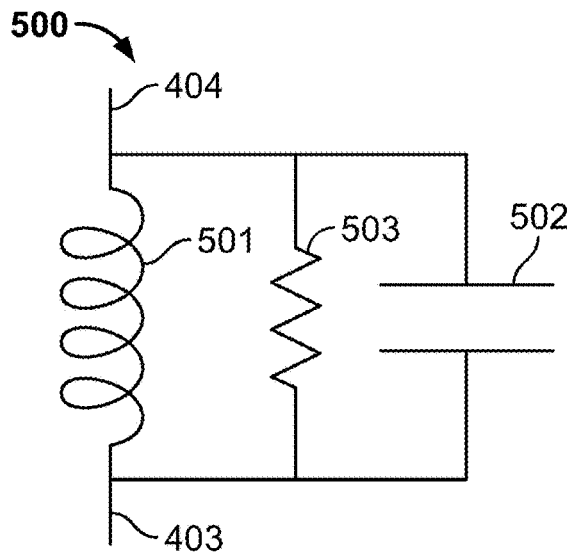
FIG. 5 is a schematic diagram of a second implementation of a reactive filter network in the electrostatic discharge protection circuitry of FIG. 3.
Figure 6:
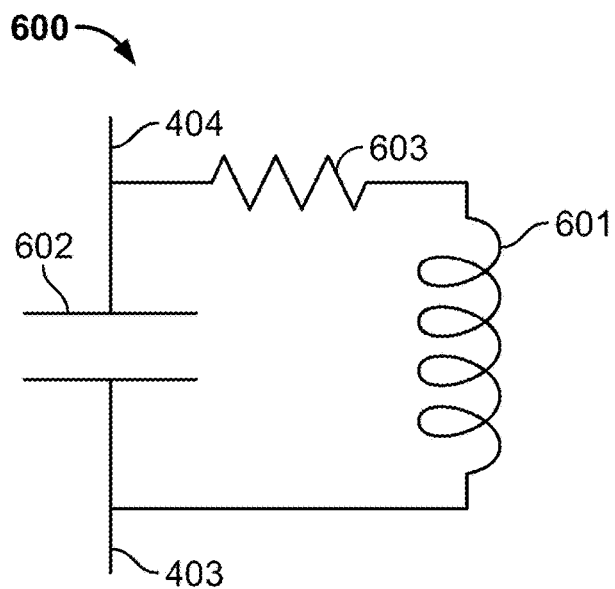
FIG. 6 is a schematic diagram of a third implementation of a reactive filter network in the electrostatic discharge protection circuitry of FIG. 3.
Figure 7:
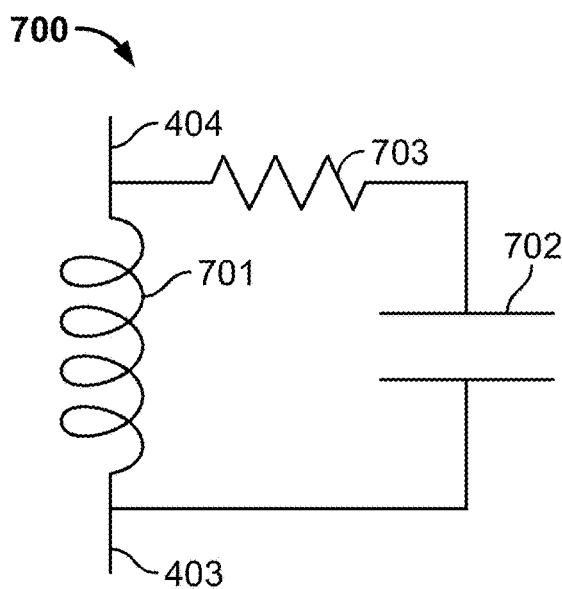
FIG. 7 is a schematic diagram of a fourth implementation of a reactive filter network in the electrostatic discharge protection circuitry of FIG. 3.

In further implementations shown in FIGS. 5-7, a resistor may be added to reactive filter 302 to improve the bandwidth and smooth out resonant peaks and dips. For example, in FIG. 5, reactive filter network 500 includes a resistor 503 in parallel with inductor 501 and capacitor 502. In another example in FIG. 6, reactive filter network 600 includes a capacitor 602 in parallel with a series combination of inductor 601 and resistor 603. In a further example in FIG. 7, reactive filter network 700 includes an inductor 701 in parallel with a series combination of capacitor 702 and resistor 703.

Generally, to calculate the inductance and capacitance values of inductors and capacitors in implementations of reactive filter network 302, the resonant frequency f of the reactive filter network ($f=1/(2\pi\sqrt{(LC)})$) should be matched to the sensitivity frequency associated with drawback of the snapback ESD device. R can be used to further optimize the transfer function of the L-C network. Based on the typical sensitivity frequencies of snapback devices (between tens of megahertz and hundreds of megahertz), the inductance may be between dozens and thousands of nanohenries and in many implementations in the hundreds of nanohenries, the capacitance can be up to thousands of picofarads and in many implementations in the dozens of picofarads, and the resistance can be between dozens of milliohms and tens of ohms, and in many implementations several ohms.

Figure 8:
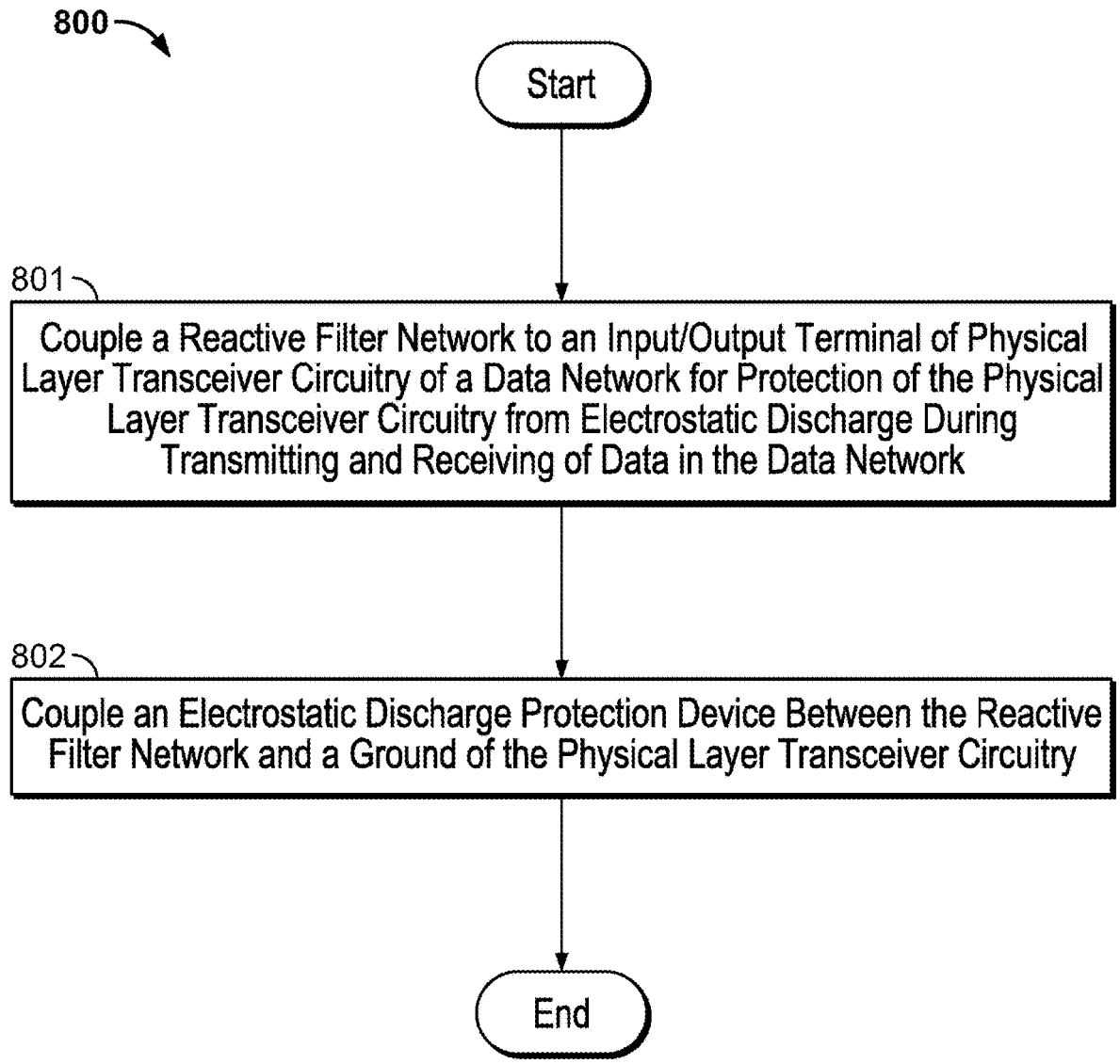
FIG. 8 is a flow diagram illustrating a method in accordance with implementations of the subject matter of this disclosure.

A method 800 for transmitting and receiving data in a data network according to implementations of the subject matter of this disclosure is diagrammed in FIG. 8. Method 800 begins at 801, where a reactive filter network is coupled to an input/output terminal of physical layer transceiver circuitry of a data network for protection of the physical layer transceiver circuitry from electrostatic discharge during transmitting and receiving of data in the data network. At 802, an electrostatic discharge protection device is coupled between the reactive filter network and a ground of the physical layer transceiver circuitry, and method 800 ends.

Thus it is seen that methods and circuits, for mitigating the effects of the discharge current flowing through an electrostatic discharge protection device that protects a transceiver in a data network, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A physical layer transceiver assembly, comprising:
   physical layer transceiver circuitry having an input/output terminal configured for coupling to data channel medium; and
   an electrostatic discharge protection circuit coupled between the input/output terminal and a ground of the physical layer transceiver assembly, the electrostatic discharge protection circuit including:
   a snapback device for electrostatic discharge protection, coupled to the ground of the physical layer transceiver assembly, and
   a reactive filter network coupled to the input/output terminal and to the snapback device, and configured to selectively limit current flow through the electrostatic discharge protection circuit at frequencies that adversely affect the snapback device.

2. The physical layer transceiver assembly of claim 1 wherein the reactive filter network is configured as a band-stop filter that limits current in a frequency band including the frequencies that adversely affect the snapback device, and passes current at frequencies above and below the frequency band.

3. The physical layer transceiver assembly of claim 1 comprising an integrated circuit die, wherein the physical layer transceiver circuitry, the input/output terminal, the snapback device, the reactive filter network and the ground of the physical layer transceiver assembly are formed on the integrated circuit die.

4. The physical layer transceiver assembly of claim 1 comprising:
   an integrated circuit package housing an integrated circuit die; wherein:
   the physical layer transceiver circuitry is formed on the integrated circuit die;
   the input/output terminal is a terminal of the integrated circuit housing; and
   the snapback device and the reactive filter network are housed in the integrated circuit package.

5. The physical layer transceiver assembly of claim 1 further comprising:
   a printed circuit board; and
   a connector mounted on the printed circuit board for coupling to the data channel medium; wherein:
   the physical layer transceiver circuitry, the snapback device and the reactive filter network are mounted on the printed circuit board; and
   the input/output terminal is coupled to the connector.

6. The physical layer transceiver assembly of claim 2 wherein the reactive filter network comprises an inductor coupled to a capacitor as an L-C circuit having a resonant frequency in the frequency band.

7. The physical layer transceiver assembly of claim 6 wherein the reactive filter network further comprises a resistor coupled to the inductor and the capacitor to adjust a transfer function of the reactive filter network.

8. A data network comprising:
   a data channel medium; and
   a plurality of physical layer transceiver assemblies, at least one of the physical layer transceiver assemblies comprising:
   physical layer transceiver circuitry having an input/output terminal;
   a connector coupled to the input/output terminal and to the data channel medium; and
   an electrostatic discharge protection circuit coupled between the connector and a ground of the physical layer transceiver assembly, the electrostatic discharge protection circuit including:
   a snapback device for electrostatic discharge protection, coupled to the ground of the physical layer transceiver assembly, and
   a reactive filter network coupled to the connector and to the snapback device, and configured to selectively limit current flow through the electrostatic discharge protection circuit at frequencies that adversely affect the snapback device.

9. The data network of claim 8 wherein the reactive filter network is configured as a band-stop filter that limits current in a frequency band including the frequencies that adversely affect the snapback device, and passes current at frequencies above and below the frequency band.

10. The data network of claim 8, wherein:
    the at least one physical layer transceiver assembly further comprises a printed circuit board; and
    the physical layer transceiver circuitry, the connector, the snapback device and the reactive filter network are mounted on the printed circuit board.

11. The data network of claim 9 wherein the reactive filter network comprises an inductor coupled to a capacitor as an L-C circuit having a resonant frequency in the frequency band.

12. The data network of claim 11 wherein the reactive filter network further comprises a resistor coupled to the inductor and the capacitor to adjust a transfer function of the reactive filter network.

13. A method for transmitting and receiving data in a data network, the method comprising:
    protecting physical layer transceiver circuitry in the data network from an electrostatic discharge by:
    selectively limiting current flow through an electrostatic discharge protection circuit by coupling a snapback device, for electrostatic discharge protection, to a ground of the physical layer transceiver circuitry;
    coupling a reactive filter network to an input/output terminal of the physical layer transceiver circuitry and to the snapback device; and
    configuring the reactive filter network to selectively limit current flow through the electrostatic discharge protection circuit at frequencies that adversely affect the snapback device.

14. The method for transmitting and receiving data according to claim 13 wherein coupling, to the input/output terminal of the physical layer transceiver circuitry, the reactive filter network that is configured to limit current at frequencies that adversely affect the snapback device, comprises coupling, to the input/output terminal of the physical layer transceiver circuitry, a reactive filter network configured as a band-stop filter that limits current in a frequency band including the frequencies that adversely affect the snapback device, and passes current at frequencies above and below the frequency band.

15. The method for transmitting and receiving data according to claim 13 wherein coupling the reactive filter network to the input/output terminal of the physical layer transceiver circuitry comprises coupling the reactive filter network to a cable connector that is coupled to the input/output terminal of the physical layer transceiver circuitry.

16. The method for transmitting and receiving data according to claim 14 wherein coupling, to the input/output terminal of the physical layer transceiver circuitry, the reactive filter network configured as the band-stop filter that limits current in the frequency band including the frequencies that adversely affect the snapback device, and passes current at frequencies above and below the frequency band, comprises coupling, to the input/output terminal of the physical layer transceiver circuitry, an inductor coupled to a capacitor as an L-C circuit having a resonant frequency in the frequency band.

17. The method for transmitting and receiving data according to claim 16 further comprising coupling a resistor to the inductor and the capacitor to adjust a transfer function of the reactive filter network.

\* \* \* \* \*